US008301639B1

(12) United States Patent
Myllymaki et al.

(10) Patent No.: US 8,301,639 B1
(45) Date of Patent: Oct. 30, 2012

(54) LOCATION BASED QUERY SUGGESTION

(75) Inventors: Jussi Myllymaki, Espoo (FI); David P. Singleton, London (GB); Al Cutter, Surrey (GB); Matthew Lewis, London (GB); Scott Eblen, London (GB)

(73) Assignee: Google Inc., Mountain View, CA (US)

( * ) Notice: Subject to any disclaimer, the term of this patent is extended or adjusted under 35 U.S.C. 154(b) by 181 days.

(21) Appl. No.: 12/697,054

(22) Filed: Jan. 29, 2010

(51) Int. Cl.
*G06F 7/00* (2006.01)
*G06F 17/30* (2006.01)

(52) U.S. Cl. .......................................... 707/748; 707/751
(58) Field of Classification Search .................. None
See application file for complete search history.

(56) References Cited

U.S. PATENT DOCUMENTS

| | | | |
|---|---|---|---|
| 5,930,474 A | 7/1999 | Dunworth et al. | |
| 7,617,205 B2 | 11/2009 | Bailey et al. | |
| 7,725,485 B1 | 5/2010 | Sahami et al. | |
| 7,870,147 B2 | 1/2011 | Bailey et al. | |
| 2006/0004850 A1 | 1/2006 | Chowdhury | |
| 2006/0098899 A1* | 5/2006 | King et al. | 382/305 |
| 2007/0061301 A1 | 3/2007 | Ramer et al. | |
| 2007/0118533 A1 | 5/2007 | Ramer et al. | |
| 2007/0143345 A1 | 6/2007 | Jones et al. | |
| 2008/0215557 A1 | 9/2008 | Ramer et al. | |
| 2009/0144257 A1* | 6/2009 | Chardon et al. | 707/5 |
| 2010/0082649 A1* | 4/2010 | Gutt et al. | 707/758 |
| 2011/0055189 A1 | 3/2011 | Effrat et al. | |

OTHER PUBLICATIONS

Aufaure, M.-A., Yu, S., Spaccapietra, S. and Cullot, N. User Profiles in Location-based Services: Make Humans More Nomadic and Personalized. In Proc. IASTED International Conference on Databases and Applications, 2004.*

* cited by examiner

*Primary Examiner* — Jay Morrison
(74) *Attorney, Agent, or Firm* — Bracewell & Giuliani LLP

(57) ABSTRACT

Methods, systems, and apparatus, including computer programs encoded on computer storage media, for suggesting search queries based on location. One of the methods includes determining a current location of the user. A selection of the user's past search queries is generated, where each past search query in the selection is associated with a query location related to the query. A respective score is assigned to each past search query in the selection. The score for each query is based at least in part on the proximity of the current location to the query location of the query. One or more of the past search queries in the selection are provided for presentation to the user on the user's electronic device based on the assigned scores.

20 Claims, 5 Drawing Sheets

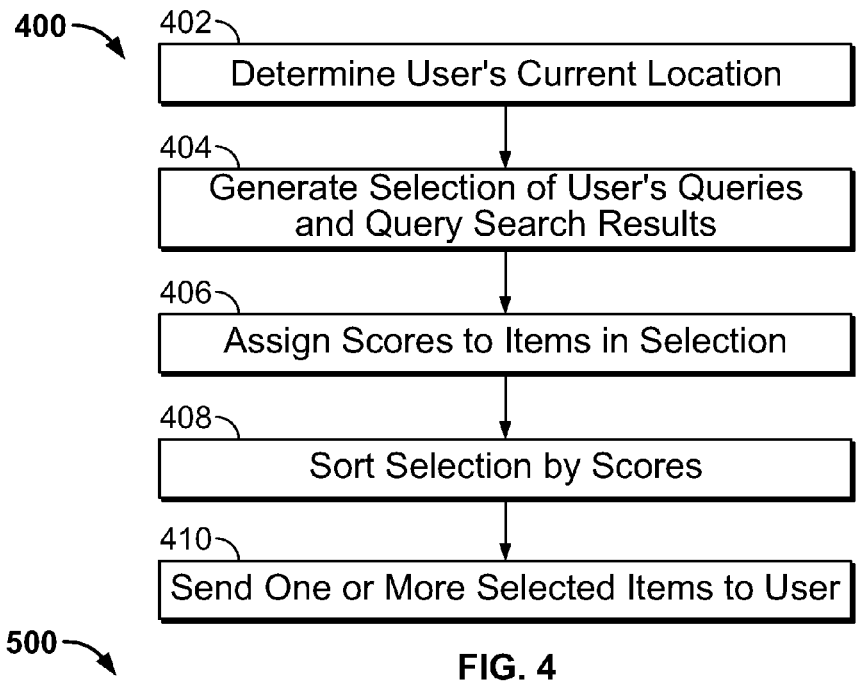
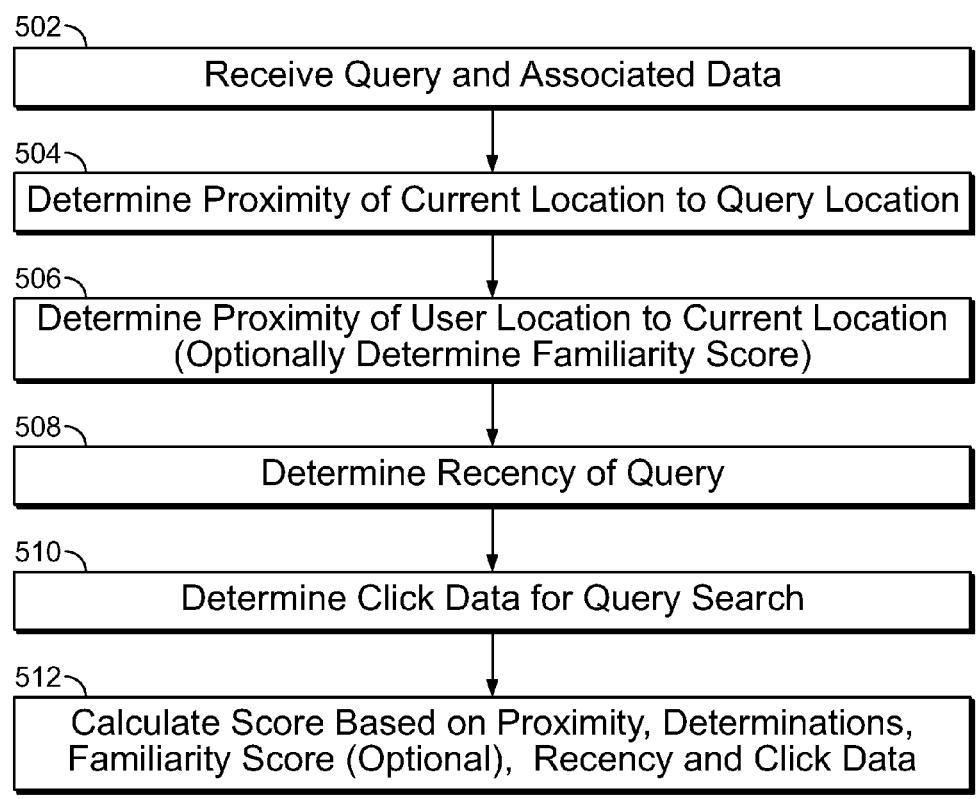

LOCATION BASED QUERY SUGGESTION

TECHNICAL FIELD

This specification relates to providing suggested search queries to an electronic device for display to a user based on the location of the electronic device.

BACKGROUND

The use of mobile electronic devices with Internet connectivity has increased significantly over the past few years, as the availability and speed of wireless Internet service has improved. Search queries that may have in the past been input by a user sitting at a home or office computer, are now often input on the fly while the user is at a location relevant to his or her particular query. For example, as a user is leaving his office, he may search for nearby restaurants on his mobile telephone. Later, as the user is leaving a restaurant, he may use his mobile telephone to search for telephone numbers for taxi-cab companies. While riding in the taxi-cab, he may search for movies playing at a nearby theater that evening.

SUMMARY

This specification describes technologies relating to providing suggested queries to a user of an electronic device. In general, one aspect, the subject matter described in this specification can be embodied in methods for providing suggested queries to a user of an electronic device which include determining a current location of the user. A selection of the user's past search queries is generated, where each past search query in the selection is associated with a query location related to the query. A respective score is assigned to each past search query in the selection. The score for each query is based at least in part on the proximity of the current location to the query location of the query. One or more of the past search queries in the selection are provided for presentation to the user on the user's electronic device based on the assigned scores. Other embodiments of this aspect include corresponding systems, apparatus, and computer programs recorded on computer storage devices, each configured to perform the actions of the methods.

These and other embodiments can each optionally include one or more of the following features, alone or in combination. One or more query search results having been previously presented to the user in response to one or more of the user's past search queries and having been previously selected by the user can be included in the generated selection. Each of the one or more query search results is associated with a location related to the query search result.

Assigning a score to a query can include assigning the score based at least in part on how recent the query was input by the user as compared to a current time. Determining the score for a query can further include basing the score on the proximity of the user's current location to the user's location when the query was input or selected by the user. Assigning a score to a query can include assigning the score based at least in part on how often the user frequents the user's current location. Assigning a score to a query can include assigning the score based at least in part on the number of search results selected by the user when the query's search results were previously presented to the user.

In general, in another aspect, a method is described that includes retrieving an item from a data store that includes multiple queries and query search results each associated with a location related to the query or query search result. The queries were previously input by a particular user and the query search results were previously presented to and selected by the user in response to a query by the user. A score is determined for the retrieved item. The score is based on the proximity of a current location of the user to the location associated with the retrieved item. The score is assigned to the retrieved item. Other embodiments of this aspect include corresponding systems, apparatus, and computer programs recorded on computer storage devices, each configured to perform the actions of the methods.

These and other embodiments can each optionally include one or more of the following features, alone or in combination. Determining the score for the retrieved item can further include basing the score on the how often the user frequents the user's current location. Determining the score for the retrieved item can further include basing the score on the proximity of the user's current location to the user's location when the retrieved item was input (if a query) or selected (if a query search result) by the user.

When the retrieved item is a query, determining the score for the retrieved item can further include basing the score at least in part on the number of search results selected by the user when the query's search results were previously presented to the user. Determining the score for the retrieved item can further include basing the score on how recent the retrieved item was input by the user (if a query) or selected by the user (if a query search result) as compared to a current time.

In general, in another aspect, a method is described that includes receiving multiple queries input by a user. For each of the queries: a time at which the user input the query is determined; a location related to the query is determined; click data related to the query is obtained, where click data indicates a number of search results generated in response to the query that were clicked on by the user. The query is associated with data including: the time, the location related to the query and the click data. The multiple queries and associated data are stored in a data store. Other embodiments of this aspect include corresponding systems, apparatus, and computer programs recorded on computer storage devices, each configured to perform the actions of the methods.

These and other embodiments can each optionally include one or more of the following features, alone or in combination. For each of the queries, a location of the user at the time the user input the query can be determined and associated with the query. For each search result clicked on by the user, where the search result was generated in response to a query, the search result data including: the time the user input the query and the location related to the query can be determined. The search result and associated data can be stored in the data store.

Particular embodiments of the subject matter described in this specification can be implemented so as to realize one or more of the following advantages. A user can be presented on a display screen of the user's electronic device with one or more suggested queries or query search results that are relevant to the user's current location without the user making any input into his electronic device, i.e., with "zero clicks". As the user's current location changes, the user can be presented with different suggestions that are relevant to his new current location. If the user had previously indicated interest in a query search result (e.g., by clicking on a webpage), the user can be presented with the query search result when it is relevant to his current location, saving the user from having to re-input the query and select from the search results. A user can be presented with locally relevant information about a location he may have previously searched but later forgotten about. For example, if the user input a query or clicked on a query search result months ago about a restaurant, and later was in the proximity of the restaurant (but had forgotten about it), he may be reminded by receiving a suggested query or query search result relating to the restaurant.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 4 is a flow chart of an example process for generating a list of suggested queries and/or query search results for presentation to a user.

FIG. 5 is a flow chart of an example process for determining a score for an item included in a history store of queries and query search results associated with query locations.

Like reference symbols in the various drawings indicate like elements.

DETAILED DESCRIPTION

Figure 1:
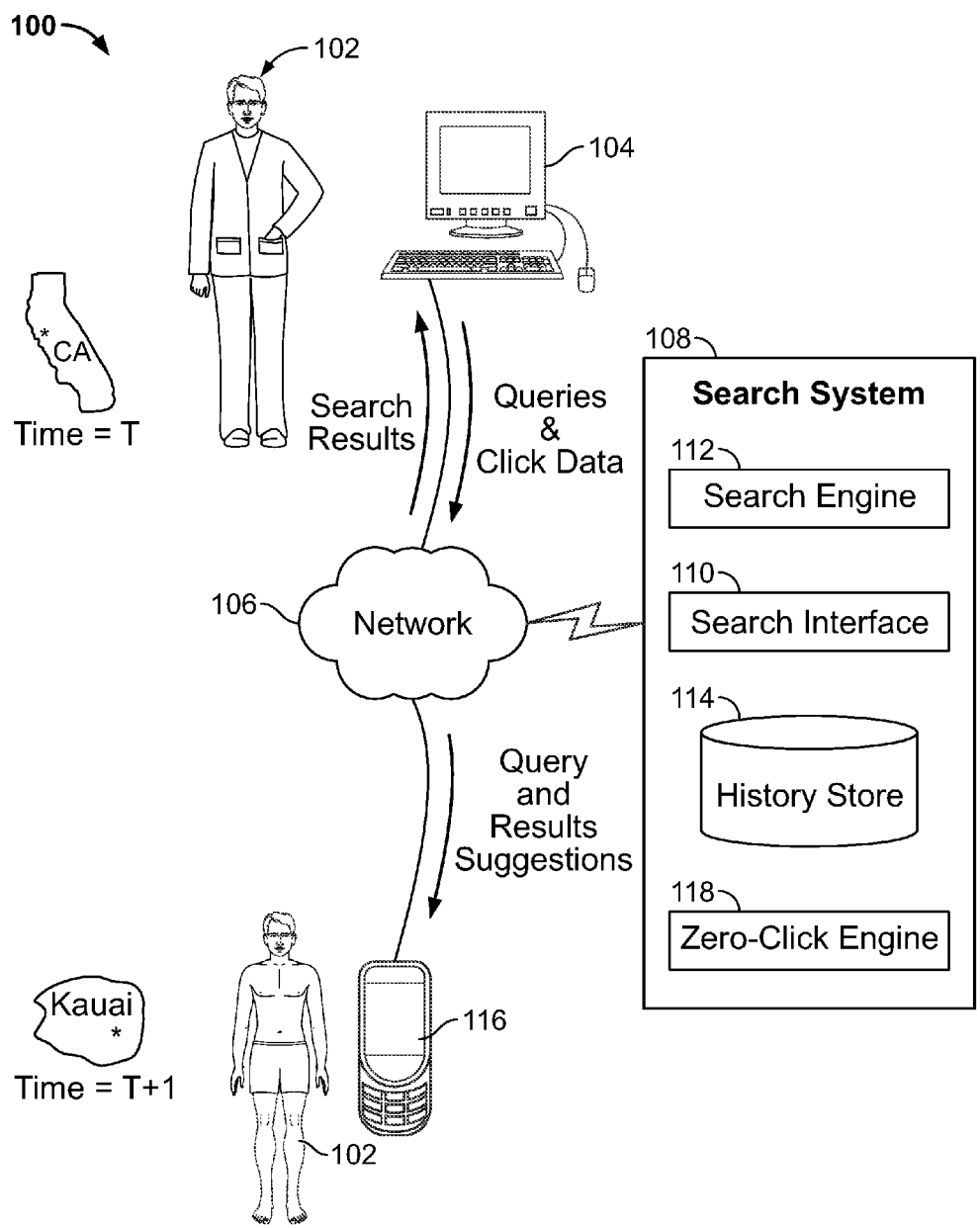
FIG. 1 is a block diagram of an example system for providing suggested queries and/or query search results to a user.

FIG. 1 is a block diagram of an example system 100 for providing suggested search queries and/or query search results to a user. Queries and query search results from the user's own search history can be matched to the user's current geographical location and presented to the user as suggested queries and/or query search results. By way of illustrative example, the user 102 may reside in San Francisco, Calif. and from his home computer 104 input various search queries while researching an upcoming trip to Kauai. His queries are transmitted over a network 106 to a search system 108. The search system 108 shown is a simplified system for illustrative purposes, but it should be understood that the search system 108 can be implemented on multiple computers at more than one physical location. In this example, the search system 108 includes a search interface 110, which can be configured to receive the user's search queries. The network 106 can include one or more local area networks (LANs), a wide area network (WAN), e.g., the Internet, a wireless network, e.g., a cellular network, or a combination of two or more of them. The search interface 110 can transmit a search query to a search engine 112, which can return a set of search results in response to the query. The search results are transmitted to the user's computer 104 for display on the computer's display device. Each search result relates to a resource and includes a link, e.g., tag with a URL (Uniform Resource Locator), to the resource. The user may click on one or more of the search results and be directed to the resource that is the target of the link. The "click data", that is, the information that the user clicked on a particular search result, can be transmitted to the search system 108.

For example, the user 104 inputs the following query: SURFING LESSONS KAUAI. The set of search results includes a search result that has a link to the website for "Kauai Surf School" and that may also include a snippet of information about the surf school. The user clicks on the link and is directed to the Kauai Surf School website, which he browses for a period of time. The user 104 also inputs the query: BEACHES KAUAI and is presented with a set of search results. The user's queries are stored in a history store 114 and are identified as queries of the particular user.

A location related to each of the user's queries is determined and associated with the query in the history store 114. For example, the location "Kauai" can be extracted from each of the two example queries above and associated with the queries as the query location. Extracting a location from the query can be performed manually or automatically. For example, one or more words forming the query can be automatically compared to a collection of words or phrases previously determined to identify locations, and if a match is found, the word or words in the query can be extracted as a location relating to the query. In some implementations, the locations identified in the collection correspond to cities, venues, addresses, landmarks and the like, and are mapped to geographic coordinates, e.g., latitude and longitude. The location associated with the query as the query location can be geographical coordinates and/or the corresponding name of the location (i.e., city, venue, etc.). In some implementations, query locations can have differing levels of granularity. For example, a first query can be related to a specific location (e.g., the geographical coordinates for the Empire State Building may be a query location for the query EMPIRE STATE BUILDING), while a second query can be related to a broader location (e.g., New York City for a query NEW YORK MARATHON).

Additionally, other data associated with each query can also be stored with each query in the data store. For example, the user's location at the time he input the query can be stored with the query as the "user location". The time when the user input the query can be stored in association with the query as the "query time". Click data, indicating the number of search results and/or which search results that were presented to the user in response to the query were clicked on by the user, can be stored in association with the query.

At a later point in time (i.e., time=T+1), the user has now traveled to Kauai. The user is traveling with a mobile electronic device 116, e.g., a mobile telephone, which is capable of communicating with the search system 108 over the network 106. A current location of the user is determined by the search system 108 as being Kauai. As is discussed further below, the current location of the user can be checked at periodic intervals by the search system 108. A zero-click engine 118 can search the history store 114 to retrieve the user's previously input queries and/or query search results. The queries and query search results for the user can be searched for those having a query location that are relevant to the user's current location, namely Kauai. The queries input by the user at time=T, when the user was at home researching his trip to Kauai, are found in the history store and can now be presented to the user as suggested queries that are relevant to his current location. For example, a message can be displayed to the user on the display screen of his mobile electronic device 116 that says "You are in Kauai", and a list of suggested queries can be presented to the user, including "SURFING LESSONS KAUAI" and "BEACHES KAUAI".

Additionally, since the user had previously clicked on the query search result for the website "Kauai Surf School", that query search result also can be retrieved from the history store and presented to the user. Therefore the user, without any "clicks" (i.e., with "zero clicks"), is presented with queries and/or query search results relevant to his current location. In other implementations, the user can initiate this process by clicking or otherwise selecting a user control to instruct his mobile electronic device to provide him with suggested queries and/or query search results, rather than the process initiating on its own.

Figure 2:
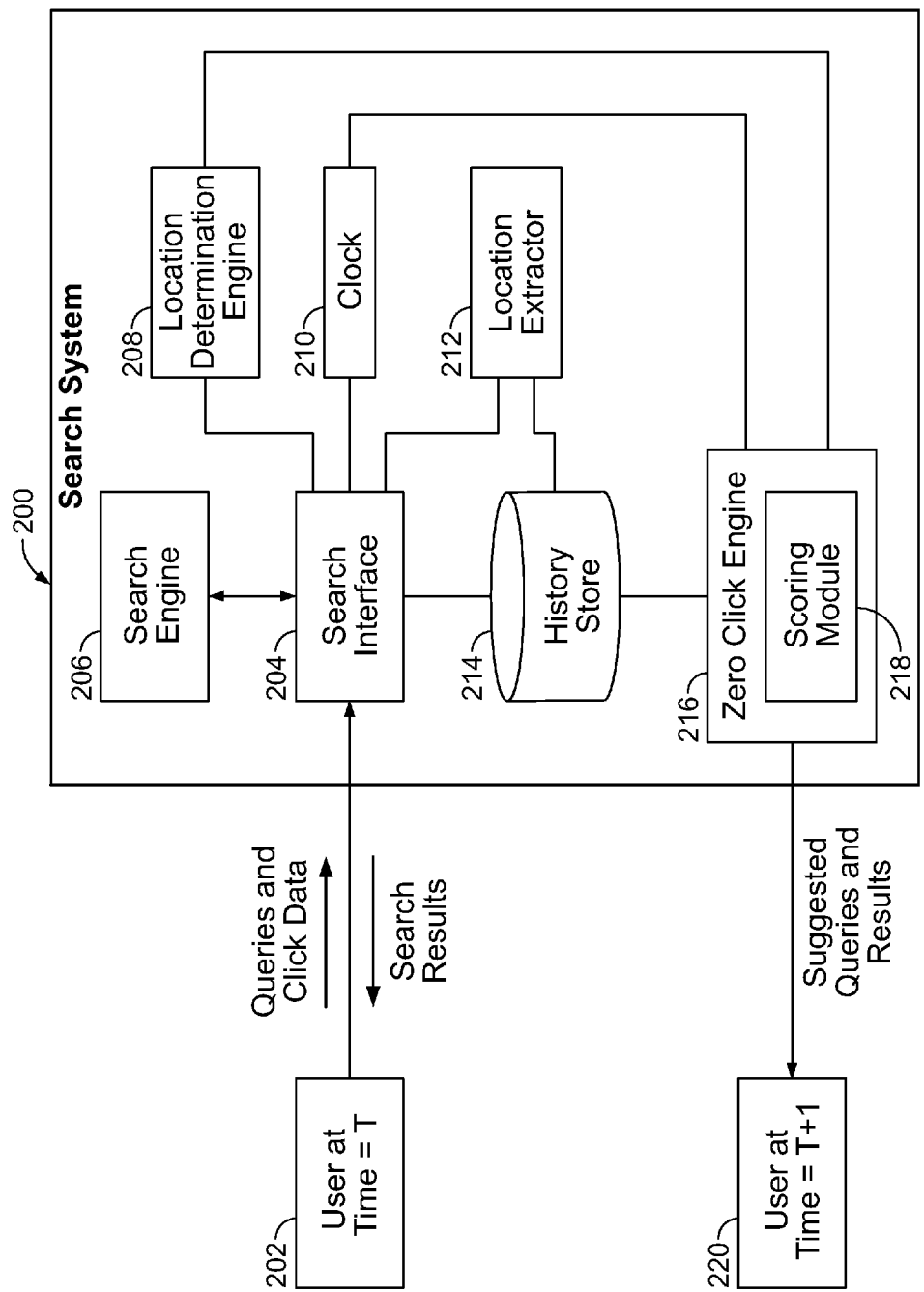
FIG. 2 is a block diagram of an example system for providing suggested queries and/or query search results to a user.

FIG. 2 shows a block diagram of an example search system 200 for providing suggested queries and/or query search results to a user. A simplified version of the search system 200 is shown for illustrative purposes, however it should be understood that the system 200 can be implemented over multiple computers which can be physically located at more than one location. A user 202 at a first time, e.g., time=T, inputs search queries that are received by the system, e.g., by a search interface 204. Each search query can be transmitted to a search engine 206 for processing. The search engine can provide a set of query search results, which are transmitted back to the user 202. The user 202 can select (e.g., click on) one or more of the query search results. Information about which query search results the user clicked on (i.e., click data) is received by the search system 200, for example, by the search interface 204.

The example system 200 described here in reference to FIG. 2 receives search queries at a search interface for transmission to a search engine. It should be understood that queries can be input and received in various types of search interfaces in various types of applications and for processing by various search engines. For example, queries can be received and collected from a map application that includes a search field where a user can input a query. In another example, queries are received and collected from a search page for a search engine that searches documents included in the World Wide Web. Other examples of applications that receive queries are possible.

Referring again to FIG. 1, a location determination engine 208 can be used to determine the location of the user at the time the user input the search query (the "user location"). For example, if the user is using a mobile electronic device, then the geographical location of the mobile electronic device (and therefore the user's location) can be determined using various techniques, some of which include using a global positioning system (GPS) information from the mobile device, cellular telephone cell tower triangulation techniques, sending a request for the location to a location service (e.g., Skyhook Wireless of Boston, Mass.), retrieving the information from the mobile electronic device's network, or receiving a manual input from the user. As another example, if the user is using a WiFi-enabled device, the location of the device may be determined using known WiFi access points and their known geographic locations. If the user is using a computer, the user's geographical location can be determined using information from the user's network provider, for example, using the user's IP address (e.g., using a service provided by IP2Location.com of Penang, Malaysia). Referring again to the previous example, the user location of San Francisco can be determined as the user's location at the time the user input the search query "SURFING LESSONS KAUAI".

The user action of inputting the search query can have a time stamp (the "query time"). A location extractor 212 can be used to determine a location related to the user's search query (the "query location"). As described above, in some implementations, each word (or words) included in the query can be checked against a collection of terms predetermined to identify locations and if a match is found that word(s) can be identified as the query location. In some implementations, the collection of terms is a database of location terms that can include administrative areas (e.g., streets, cities, districts, states, provinces, countries), geographical features (e.g., mountains, rivers, lakes), landmarks (e.g., important buildings, monuments) and venues (e.g., parks, stadiums). Each location term can have a corresponding latitude and longitude and may also include a shape or extent. The location extractor 212 can extract the location term and the corresponding latitude and longitude, and shape/extent if there is one, from the database of location terms.

In the above example, the term "KAUAI" is identified as a location and the location extractor 212 can identify Kauai as the query location. Other techniques for determining a location that is related to the query can be used. For example, if the query is input into a search field in a map application, the user's interaction with a map displayed by the map application can be used to determine a location relating to the query. By way of illustration, if a map of Hawaii was displayed to the user, and the user zoomed in on the map to Kauai and then input a search query BEACHES, then query location can be determined to be Kauai, even though Kauai was not a term in the query.

The history store 214 is configured to store a set of queries and optionally query search results for one or more users. The queries and query search results for a particular user can be identified within the history store 214 as belonging to the particular user. In some implementations, the user logs into the search system 200 and can be identified by data stored in a cookie. A unique identifier for the user can be used to label his queries in the query index 202.

Each query and query search result in the history store 214 can be labeled with a query location, i.e., a location related to the query or query search result. The query or query search result can be sent to the history store 214 from the search interface 204 already labeled with the query location. Alternatively, the query or query search result can be sent to the history store 214 at a first time, and then at a later second time, the query location can be sent to the history store 214.

The search system 200 can be further configured to associate other data with each query or query search result, including for example, the user location and query time for each query. Click data for a query can also be associated with the query in the history store 214, where the click data can indicate the number of search results clicked on by a user when presented with the search results to the query, and/or indicate the particular search results that were clicked on by the user.

The history store 214 can further include query search results that were previously selected by the user when presented to the user in response to one of their queries. The query search result can also be labeled with one or more query locations, which can be derived from the query search result itself and/or from the query corresponding to the query search result. For example, if the query is "SURFING LESSONS KAUAI" and the query search result is "Poipu Surf Academy", the location "Kauai" can be extracted from the query and the more specific location "Poipu" (a town in Kauai) can be extracted from the query search result. Either or both locations can be used to label the query search result item within the history store 214.

Each item (i.e., query or query search result) in the history store 214 can be labeled with more than one query location. For example, the query "SURFING LESSONS KAUAI" can be labeled with the query location "Kauai". However, since Kauai is within the state of Hawaii, the larger location "Hawaii" can also be used to label the query. In the previous example, the user may initially land at the airport in Honolulu, Hi., before catching a connecting flight to the island of Kauai. Once he lands in Hawaii, the history store 214 can be searched for suggested queries and query search results relevant to his current location of Hawaii, and therefore find the query "SURFING LESSONS KAUAI", even before he has arrived in Kauai. The query search result "Poipu Surf Academy" can be labeled with the query locations Poipu, Kauai and Hawaii.

In other implementations, each query and query search result can be labeled with one query location, however, a match of a current location to a query location can include a radius broad enough to capture locations that are different than, but close to, the user's current location. For example, a query labeled with the query location Poipu can still be retrieved from the history store and presented to the user when he lands in Honolulu, if Poipu is within a certain predetermined radius of the user's current location. In some implementations, the predetermined radius can vary (i.e., be increased or decreased) as a function of the density of items in the history store. For example, it may be desired to fetch a particular number of items from the history store. The radius can be increased or decreased depending on the density of items in the history store having a query location in the proximity of the current location. If there are few items in the history store having a query location within the predetermined radius to the current location, then the radius can be increased to increase the number of items that will be fetched.

In some implementations, geographic coordinate locations corresponding to a location or venue derived from a query or a query search result can be determined from a look-up table having location and venue names correlated to corresponding geographic coordinates, e.g., GPS coordinates. The distance between two locations can then be computed by known methods. Particular locations or venues may have their separation distance determined beforehand and such a distance can be used.

A zero click engine 216 can be configured to search the history store 214 for queries and query search results to present to the user 220 at a later time (e.g., time=T+1) based on his current location at that later time. In some implementations, the zero click engine 216 can determine the current location of the user's device, e.g., by using the location determination engine 208, and then provide the user's device° with a selection of queries and query search results retrieved from the history store 214 that have a query location matching his current location. What constitutes a matching location can vary in different implementations. For example, if the query location is within a predefined radius of the current location, the locations can be considered a match.

In some implementations, the closer the query location is to the current location, the higher up the list of presented suggestions the query or query search result can be positioned. In such implementations, a scoring module 218 can be configured to determine and assign a score to items retrieved from the history store 214 for the user, and the scores can be used to rank the retrieved items for presentation to the user. For example, the closer in proximity the user's current location is to the query location, the higher a score that can be assigned to the query. In some implementations, the closeness of the current location to a location related to a previously-clicked-on query result for the query can be used to determine the score. That is, if for a particular query the user had clicked on a search result, and the query search result was related to a location is that is close to the current location, then the score for that particular query can be boosted.

Other factors can be used by the scoring module 218 to determine a score for a query. For example, the recency of the query can be determined by comparing the query time to the current time. The more recent a query, the higher the score that can be assigned to the query. As another example, click data associated with a query can be used to determine the score. For example, the more query search results that were clicked on by a user, the higher the score that can be assigned to the corresponding query.

Figure 3:
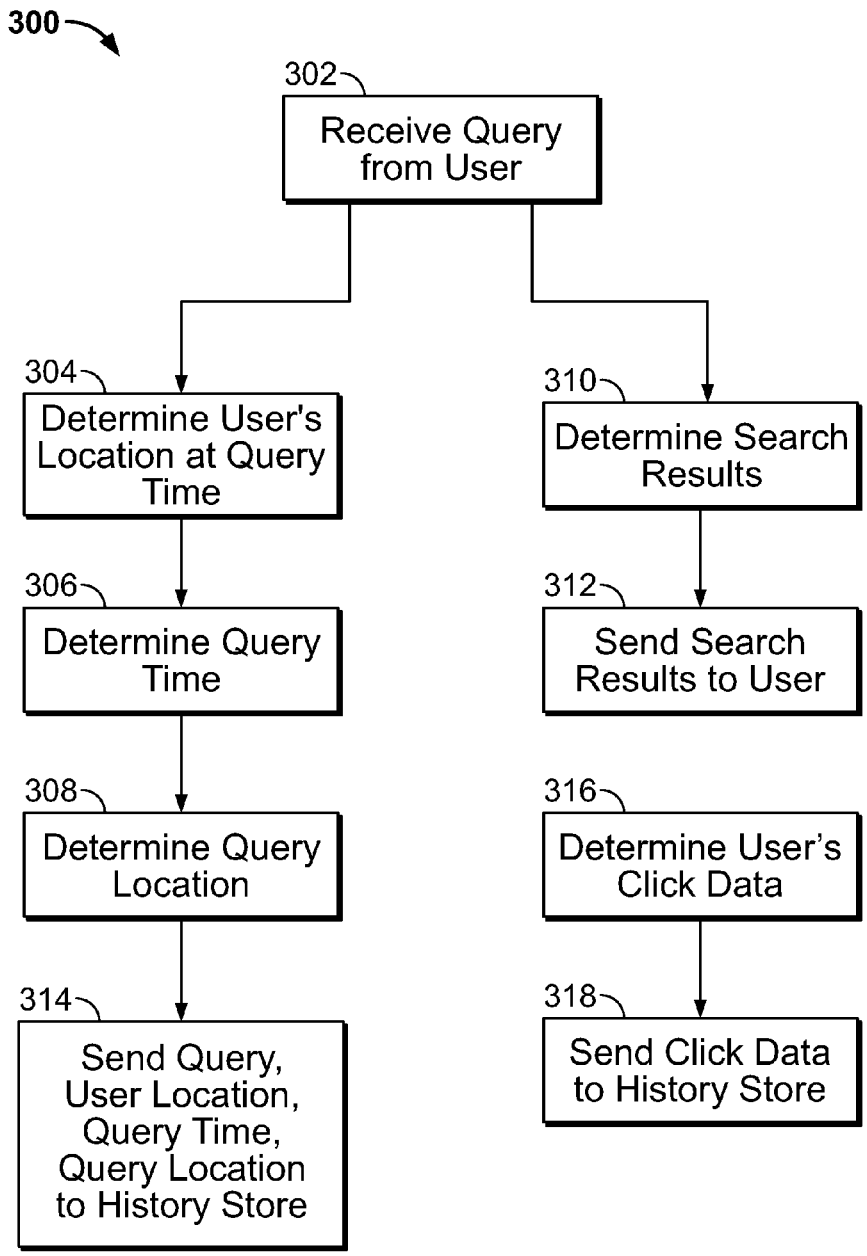
FIG. 3 is a flow chart of an example process for generating a history store of queries and query search results associated with query locations.

FIG. 3 is a flow chart of an example process 300 for generating a history store of queries associated with location data. A query is received from a user (Step 302). By way of illustrative example, the process 300 can be described in reference to the example system 200 in FIG. 2, although it should be understood that a differently configured system can be used to implement the process 300. In this example, the query can be received from the user 202 by the search interface 204. The user's location at the time of inputting the query is determined (Step 304). For example, the location determination engine 208 can be used to determine the user's location.

The time at which the user input the query is determined (e.g., a time stamp of the user action) (Step 306). A timestamp can be included with the query, or alternatively, the query can be time stamped when received by the search interface 104.

A location related to the query is determined (Step 308). For example, the location extractor 212 can be used to extract a location from the query search terms, as described above. That is, the search terms forming the query can be compared to a collection of terms known to identify locations. If a match is found, the term or terms can be identified as the query location. The query location can be a geographical location, e.g., a city name, can be the name of a venue, e.g., Empire State Building. In some implementations, a look-up table having location and venue names and corresponding geographic coordinate locations, e.g., GPS coordinates, can be used to retrieve geographical coordinates for the query location.

Not all queries will include the query location within the search terms. Accordingly, other techniques can also be used to determine the query location. For example, a query for SUBWAYS does not include a geographical location, and since subways are present in multiple different locations, a particular location cannot be inferred from the search query alone. If no location relating to the query can be determined from the query search terms, then the location of the user at the time the query was input can be used as the query location. In other implementations, a query location can be inferred from one or more query search results clicked on by the user. For example, if the user queries SUBWAYS and then clicks on a query search result for New York City Transit, the location "New York City" can be extracted from the query search result and used as the query location for the corresponding query SUBWAYS.

In response to receiving the query from the user, a set of search results responsive to the query is determined (Step 310) and sent to the user (Step 312), for example, as a list with the most relevant search results positioned highest in the list, although other techniques for presenting search results can be used.

The query is sent to the history store and labeled with the query location. In the particular example discussed here, additional data is associated with the query can also be sent to the history store (Step 314). The additional data includes the user location at the time the query was input and the time the query was input. However, it should be understood that in other implementations, the additional data is not sent to the history store, only some of the additional data is sent, or other additional data is sent to the history store in association with the query. Over time, as the user continues to input queries, the history store of the user's past queries accumulates. If the history store is used to store past queries of multiple users, the queries can be identified as originating from a particular user, so that the particular user's past history of queries can be identified and retrieved from the history store. The user can be asked whether or not he agrees to having his past queries included in the history store, and can opt not to participate, in which case his past queries will not be labeled with a query location and stored for later use.

If the user may select one or more query search results in order to view more information, for example, to be directed to a website pertaining to the search result. Information about the search results selected by the user can be referred to as the "click data" for the query, since a user typically "clicks" on a result to select the result, although other techniques for selecting a result can be used. The click data for the query can be determined (Step 316). The click data can include the number of query search results that were clicked on by a user for a particular query, which can indicate the user's interest in the query search results.

In some implementations, the history store can also be used to store query search results labeled with a query location, as was discussed above. In such implementations, the click data can include the clicked search results. Each clicked search result can be included as an item in the history store that is labeled with a location related to the search result. Additional data can be associated with the search result, such as the time the search result was presented to the user and/or the user's location when the search result was presented to the user. The click data is sent to the history store (Step 318). In implementations where the history store includes clicked on search results, the clicked on search results associated with query locations and optionally additional data also is sent to the history store.

The query location for a query search result can be the query location of the corresponding query. In other implementations, a location can be extracted from the query search result itself. As was discussed above in a previous example, if the user queries SURFING LESSONS KAUAI and is presented as a search result with a link to a website for the "Poipu Surf Academy", then the location "Poipu" can be extracted from the search result and used as the query location for that particular search result. In another example, any search results generated in response to the query SURFING LESSONS KAUAI, which is labeled with the query location "Kauai", can automatically be labeled with the same query location, i.e., Kauai. In other implementations search results that have not been clicked by the user can also be stored in the history store and labeled with a query location, which location can be determined as discussed above.

FIG. 4 is a flow chart of an example process 400 for generating a selection of suggested queries and/or query search results for presentation to a user. The current location of the user's device is determined, which can be taken as the user's current location (Step 402). By way of illustrative example, the process 400 can be described in reference to the example system 200 in FIG. 2, although it should be understood that a differently configured system can be used to implement the process 400. For example, the location determination engine 208 can be used to determine the user's current location.

A selection of the user's past queries is generated (Step 404). In implementations where suggested query search results also can be presented to the user, the selection can include the user's past queries and previously presented search results (i.e., presented in response to the past queries). Preferably the previously presented search results is narrowed to include only search results previously selected (i.e., clicked) by the user.

In some implementations, all the past queries and query search results stored for the particular user in the history store 214 are included in the generated selection, which includes the query location and user location (i.e., location of user at time the query was input). The selection can be processed to generate two further selection: the first selection can order the selected items based on the distance between the user's current location and the query location (e.g., the closest items are positioned highest on a list represented the first selection); and the second selection can order the selected items based on the distance between the user's current location and the user location (i.e., location at query time). A score is assigned to the selected items (Step 406).

The score assigned to a selected item (i.e., to a query or query search result) can be determined so that items most probable to be relevant to the user's current context are presented to the user at the top of a listing of the selected items. In some implementations, the items for the user included in the history store can be indexed by either or both of the user location and query location, e.g., to avoid retrieving the entire history for the particular user for scoring. If the user's device has a relatively small display area, e.g., a mobile telephone, then the number of items that can be presented to the user may be limited, in which case selecting the few items for presentation to the user is that much more important. In some implementations a scoring function can be used that generates a score based on the proximity of the user's current location to the query location. The scoring function can also generate the score based on the recency of the query as compared to the current time, the distance between the user's current location and the user location for the query and/or an estimated level of interest in search results that were generated for the query (if the selected item is a query and not a query search result).

The selection can be sorted according to the assigned scores, with the higher scoring items at the top of the selection (Step 408). In implementations where two selections are generated, the two selections can be merged and sorted (or sorted and merged). One or more selected items of the sorted list, e.g., the top N items (N being an integer), are sent to the user's device for presentation to the user (Step 410). For example, if the user's device is a mobile telephone with limited screen space, then N may be a small number like five or three items. If the user's device is a computer with a full screen, then N can be a larger number, thereby presenting the user with many different suggested queries and query search results.

The user can chose to select one of the suggested queries, in which case the query is submitted to a search engine and a fresh set of search results is generated and presented to the user. The user can chose to select one of the suggested query search results, in which case he can obtain more information about the result. For example, a query search result provides a link to a webpage, in which case clicking the query search result directs the user to the webpage.

FIG. 5 is a flow chart of an example process for determining a score for an item included in a history store of queries and query search results that are labeled with a query location. By way of illustrative example, the process 500 shall be described in relation to the example scoring function set out below, although it should be understood that a different scoring function can be used.

$$\text{Score} = A^* \text{distance}(\text{current location}, \text{query location}) + B^* \text{distance}(\text{current location}, \text{user location}) + C^* (\text{current time}, \text{query time}) + D^* \text{length}(\text{clicked search results}) + E$$

In a simple implementation, the values A, B, C, D and E are determined by manual iteration and evaluation. In other implementations, the values can be determined by a machine learning system. The value of E is a constant which can be used to boost the score of items considered to be more interesting and can be eliminated or set to zero.

A selected item, i.e., a query or query search result, is received, for example, by a scoring module included in a zero click engine, such as the scoring module 218 and zero click engine 216 shown in FIG. 2 (Step 502). The selected item comes labeled with a query location and the proximity of the query location to the user's current location is determined (Step 504).

The proximity of the user location (i.e., the location of the user when he input the query) to the user's current location is determined (Step 506). Using this proximity determination can help to provide relevant suggestions in the following type of scenario. The user goes to Cambridge infrequently, but when he does go there, he often needs to find the telephone number of a taxi-cab company and he likes to visit the same restaurants each visit. At a point in time, the user is in Cambridge (i.e., his user location is Cambridge) and inputs a search query TAXI-CAB and another search query RESTAURANTS CAMBRIDGE. In response to the restaurants query, the user clicks on the "The Gardenia" search result. Now at a later point in time the user is again in Cambridge and the zero click engine presents him with the suggested queries TAXI and RESTAURANTS CAMBRIDGE and the suggested query search result "The Gardenia". Because these queries and query search result were input by the user when he was in Cambridge, they are labeled with the user location of Cambridge. Later, when the user's current location is Cambridge, there is a close proximity (i.e., direct match) of his current location to the user location for these items in the selection, which is factored into their scores.

In some implementations, the value B in the above scoring function can be set to zero (0), or this step eliminated altogether, to prevent queries input at locations the user frequents (e.g., his home and office) from always showing up when the user is near those locations and effectively drowning out other, potentially more interesting, queries.

In some implementations, to avoid the above described problem, a location familiarity score for the user's current location can be determined, for example, using the following function:

$$\text{Familiarity} = \text{Count(All locations)} / \text{Count(Locations within } X \text{ km/ml of Current Location)}$$

In the above formula, the Count (All locations) refers to the total number of current locations reported for the user, which can be limited in some examples to a certain time period. For example, a historical set of reported current locations for the user can be stored (optionally with timestamps) in a store of location history indexed by user. The value for Count (All locations) can be obtained from the store of location history. The Count (Locations within X km/ml of Current Location) refers to the number of total locations within the store of location history for the user that are within a predefined distance to the user's current location. Consider the following illustrative example: the user's current location is a coffee shop a block from his office and the predefined distance is 1 kilometer (or ½ mile). The Count (All locations) value is 100 locations. The Count (Locations within 1 km of current location) is 55 locations. The Familiarity score is therefore 100/55 or 1.8. Later, the user is 5 kilometers away from his office and the Count (Locations within 1 km of current location) is only 10 locations. The Familiarity score is therefore 100/10 or 10. The familiarity score can then be used to determine the value of B, for example, B=B'*Familiarity. B' can be determined by manual iteration and evaluation or by a machine learning system. Multiplying the value B' by the Familiarity score can boost scores for queries input by a user in a location of which he does not usually frequent when he is later at the same location, e.g., Cambridge, in the above example, by giving a higher score to a current location the user visits less often and a lower score to a current location the user frequents often (e.g., his office). In some implementations, certain queries (or types of queries) can be suggested to the user when he is at places he frequents, for example, queries relating to stock prices or the weather can be suggested to him when he is at a location having a very low familiarity score indicating he frequents it often, such as his home or office.

Referring again to FIG. 5, the recency of the selected item can be determined (Step 508). For example, the current time can be determined and compared to the time stamp given to the query or query search result. The more recent a query was input (or query search result selected), the higher the score the query or query search result can be assigned.

Click data for the search results for a query (or for a query search result) can be determined (Step 510). If the selected item is a query, then the click data for the query may be indicative of how responsive the search results were to the query (i.e., the "success" of the query). In one example, the number of search results selected (e.g., clicked on) by the user can be used to estimate the query's success. If the selected item is a query search result, then click data for the query search result can be indicative of how responsive the particular query search result was to a corresponding query. Other click data, such as the length of time the user spent at a webpage corresponding to the clicked on query search result, can also be used to estimate the success of the query search result.

A score for the selected item can be calculated based on the above discussed determinations (Step 512). In some implementations, the score is calculated using the scoring function set forth above. That is, a multiplier can be determined for each of the 4 factors and can be multiplied by the determinations made in steps 504-510 above to calculate a score, which may or may not be adjusted by a constant E.

In some implementations, the specificity of the query location can be used when calculating the score. That is, the more specific a query location, the higher the score can be assigned, as compared to a query location that is rather broadly defined. For example, the query location "Manhattan" is not that specific, since Manhattan is an entire borough of New York City. By comparison, the query location "Greenwich Village", which is only a small section of Manhattan, is more specific. Accordingly, a query having the query location Manhattan can score lower for specificity than a query having the query location Greenwich Village, however, the Manhattan query can score higher overall if the user's proximity is closer to the center of Manhattan than Greenwich Village and/or if the query time of the query for Manhattan is significantly more recent than the query for Greenwich Village.

The process 400 in FIG. 4 can be initiated automatically based on various triggers. For example, in some implementations, the process 400 can be scheduled to execute periodically at a predefined interval, e.g., every 15 minutes. In other implementations, the process 400 can be triggered once the user's current location has changed by a certain predefined distance. In such implementations, the user's current location can be periodically determined and compared to a last reported current location to calculate the change, if any, in the user's current location since the last report. In other implementations, the user can initiate the process manually, for example, by selecting an icon on his display screen, clicking a button, or otherwise inputting a command to present him with suggested queries and query search results. In some implementations, the command can be as subtle as placing the focus of a web browser on a search field displayed by the web browser application. A user control can be provided to the user so the user can manually change the trigger to initiate the process. For example, as a default the process can initiate every 15 minutes, but the user can be permitted to change the default to initiate more or less frequently, on-demand-only, or when his current location has changed by a predefined amount, which the user may also be also to set.

Figure 6:
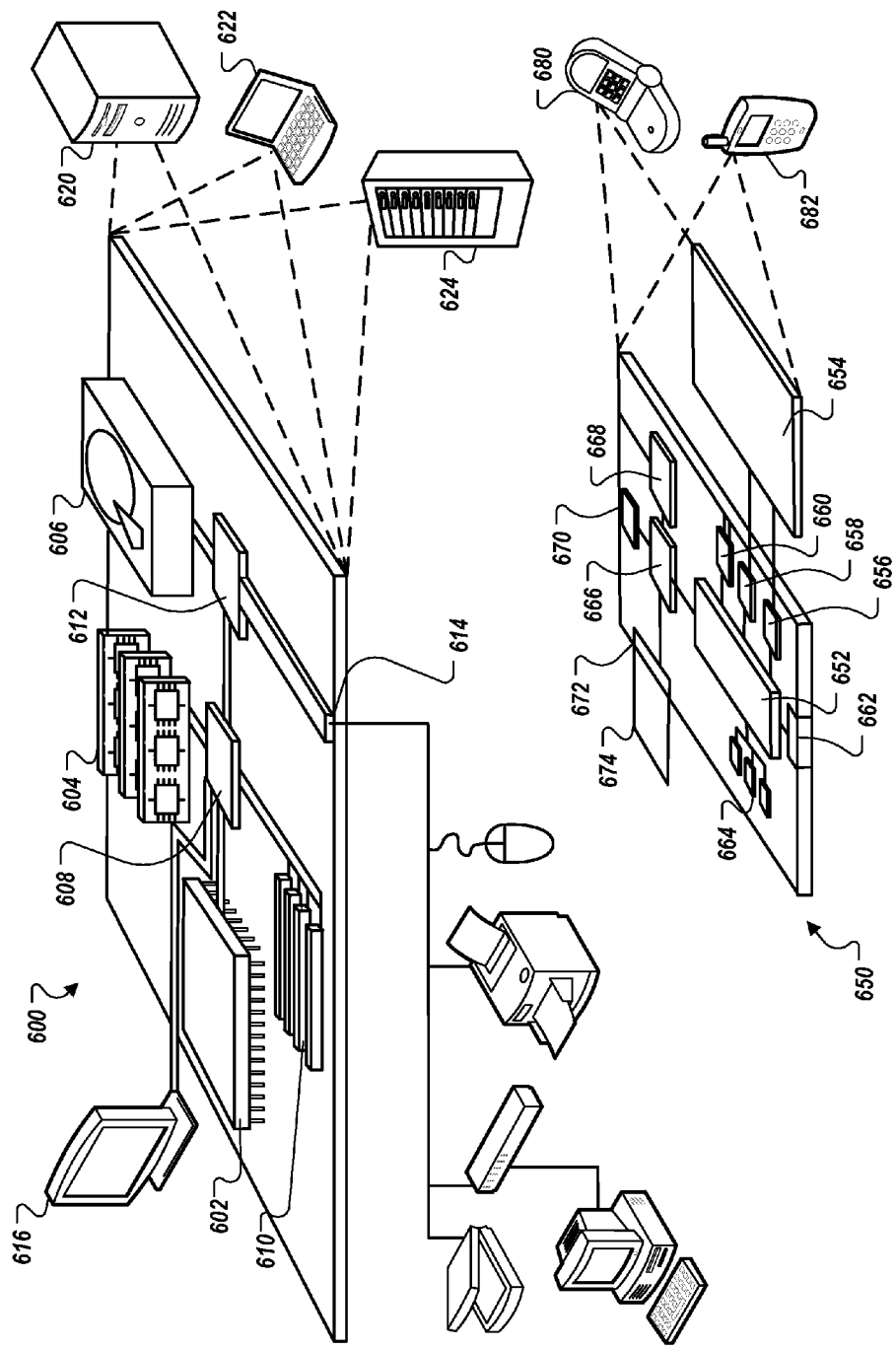
FIG. 6 shows examples of computer devices that may be used to execute the actions discussed in this document.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 may execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 may be implemented as one or more of a computer-readable medium or media, a volatile memory unit or units, or a non-volatile memory unit or units. Expansion memory 674 may also be provided and connected to device 650 through expansion interface 672, which may include, for instance, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Device 650 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 650 and used to update the display of the respective devices 650 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   determining a current location of a user of an electronic device;
   generating a selection of a plurality of the user's past search queries in response to determining the current location of the user, where each past search query in the selection is associated with a query location that is determined from terms of the past search query and independently of a user location when the past search query was submitted;
   assigning a respective score to each past search query in the selection, where the score for each past search query is based at least in part on the distance between the current location and the query location of the past search query; and
   providing one or more of the past search queries in the selection for presentation to the user on the user's electronic device based on the assigned scores and in response to determining the current location of the user.

2. The method of claim 1, further comprising:
   identifying one or more query search results previously selected by the user after having been previously presented to the user in response to one or more of the user's past search queries, where each of the one or more query search results is associated with a query location related to a past search query;
   assigning a respective score to each of the one or more identified query search results based at least in part on a distance between the query location associated with the query search result and the user's current location; and
   providing one or more of the query search results for presentation to the user on the user's electronic device based on the assigned scores and in response to determining the current location of the user.

3. The method of claim 1, wherein assigning a score to a past search query in the selection comprises assigning the score based at least in part on how recently the past search query was input by the user.

4. The method of claim 1, wherein assigning a score to a past search query comprises assigning the score based at least in part on how often the user frequents the user's current location.

5. The method of claim 1, wherein assigning a score to a past search query comprises assigning the score based at least in part on the number of search results selected by the user when the past search query's search results were previously presented to the user.

6. A computer-implemented method comprising:
   determining a current location of a user of an electronic device;
   retrieving a plurality of items from a data store in response to determining the current location of the user, the data store storing a plurality of queries and search results responsive to the queries, each query and responsive search result associated with a query location that is determined from terms of the query and independently of a user location when the query was submitted;
   assigning a score to each of the plurality of retrieved items based on the distance between the current location and the query location associated with the retrieved item; and
   providing one or more of the retrieved items for presentation to the user on the electronic device based on the scores and in response to determining the current location.

7. The method of claim 6, wherein determining the score for the retrieved item further comprises basing the score on the how often the user frequents the current location.

8. The method of claim 6, wherein determining the score for the retrieved item further comprises basing the score on the distance between the current location and the query location associated with the retrieved item.

9. The method of claim 6, wherein when the retrieved item is a query, determining the score for the retrieved item further comprises basing the score at least in part on the number of search results selected by the user when the query's search results were previously presented to the user.

10. The method of claim 6, wherein determining the score for the retrieved item further comprises basing the score on when the retrieved item was stored in the data store.

11. A computer-readable medium having instructions encoded thereon, which, when executed by a processor, cause the processor to perform operations comprising:
    determining a current location of a user of an electronic device;
    generating a selection of a plurality of the user's past search queries in response to determining the current location of the user, where each past search query in the selection is associated with a query location that is determined from terms of the past search query and independently of a user location when the past search query was submitted;
    assigning a respective score to each past search query in the selection, where the score for each past search query is based at least in part on the distance between the current location and the query location of the past search query; and
    providing one or more of the past search queries in the selection for presentation to the user on the user's electronic device based on the assigned scores and in response to determining the current location of the user.

12. The computer-readable medium of claim 11, the operations further comprising:
    identifying one or more query search results previously selected by the user after having been previously presented to the user in response to one or more of the user's past search queries, where each of the one or more query search results is associated with a query location related to a past search query;

assigning a respective score to each of the one or more identified query search results based at least in part on a distance between the query location associated with the query search result and the user's current location; and providing one or more of the query search results for presentation to the user on the user's electronic device based on the assigned scores and in response to determining the current location of the user.

13. The computer-readable medium of claim 11, wherein assigning a score to a past search query comprises assigning the score based at least in part on how recently the past search query was input by the user.

14. The computer-readable medium of claim 11, wherein assigning a score to a past search query comprises assigning the score based at least in part on how often the user frequents the user's current location.

15. The computer-readable medium of claim 11, wherein assigning a score to a past search query comprises assigning the score based at least in part on the number of search results selected by the user when the past search query's search results were previously presented to the user.

16. A system comprising:
   one or more processors;
   one or more storage devices coupled to the one or more processors and configurable for storing instructions, which, when executed by the one or more processors cause the one or more processors to perform operations comprising:
      determining a current location of a user of an electronic device;
      generating a selection of a plurality of the user's past search queries in response to determining the current location of the user, where each past search query in the selection is associated with a query location that is determined from terms of the past search query and independently of a user location when the past search query was submitted;
      assigning a respective score to each past search query in the selection, where the score for each past search query is based at least in part on the distance between the current location and the query location of the past search query; and
      providing one or more of the past search queries in the selection for presentation to the user on the user's electronic device based on the assigned scores and in response to determining the current location of the user.

17. The system of claim 16, the operations further comprising:
   identifying one or more query search results previously selected by the user after having been previously presented to the user in response to one or more of the user's past search queries, where each of the one or more query search results is associated with a query location related to a past search query;
   assigning a respective score to each of the one or more identified query search results based at least in part on a distance between the query location associated with the query search result and the user's current location; and
   providing one or more of the query search results for presentation to the user on the user's electronic device based on the assigned scores and in response to determining the current location of the user.

18. The system of claim 16, wherein assigning a score to a past search query in the selection comprises assigning the score based at least in part on how recently the past search query was input by the user.

19. The system of claim 16, wherein assigning a score to a past search query comprises assigning the score based at least in part on how often the user frequents the user's current location.

20. The system of claim 16, wherein assigning a score to a past search query comprises assigning the score based at least in part on the number of search results selected by the user when the past search query's search results were previously presented to the user.

* * * * *